United States Patent [19]

Fabian et al.

[11] 4,082,238
[45] Apr. 4, 1978

[54] AIRCRAFT CONTROL SYSTEM PROVIDING HARDOVER PROTECTION AND FULL CONTROL AUTHORITY

[75] Inventors: Gordon R. Fabian; James H. McCollum; Leo P. Kammerer, all of Cedar Rapids, Iowa

[73] Assignee: Rockwell International Corporation, El Segundo, Calif.

[21] Appl. No.: 712,130

[22] Filed: Aug. 5, 1976

[51] Int. Cl.² .............................................. B64C 13/02
[52] U.S. Cl. .................................. 244/17.13; 244/177; 244/194
[58] Field of Search ........................ 73/178 R, 178 H; 91/361, 362, 363 R, 364; 235/150.2; 244/17.13, 175, 177, 178, 179, 181, 194, 196, 197; 318/584–586, 616, 618, 621, 635; 340/27; 416/30, 35

[56] References Cited

U.S. PATENT DOCUMENTS

| 3,528,633 | 9/1970 | Knemeyer ................. 244/17.13 X |
| 3,920,966 | 11/1975 | Knemeyer et al. ........... 244/17.13 X |
| 3,935,523 | 1/1976 | Cleveland et al. .............. 318/616 X |

Primary Examiner—Stephen G. Kunin
Attorney, Agent, or Firm—Terry M. Blackwood; Robert J. Crawford; L. Lee Humphries

[57] ABSTRACT

In a helicopter a servo system connected to operate in parallel with the rotor blade pitch controlling linkages and also to receive autopilot generated signals directing maneuvers. The system limits the autopilot control over the blade pitch or position in the short term and permits full control over the long term.

5 Claims, 5 Drawing Figures

AIRCRAFT CONTROL SYSTEM PROVIDING HARDOVER PROTECTION AND FULL CONTROL AUTHORITY

This invention generally relates to electronics and to position control systems. More particularly, the present application of this invention relates to controlling the effect had by an autopilot generated command signal on the pitch of helicopter rotor blades.

Autopilot systems, from data received from various sensors and on-board computers, generate aircraft maneuver commands and present same to appropriate position servo systems which in turn automatically position the aircraft control surfaces. To avoid disastrous results should the autopilot malfunction and direct severe and sustained control surface deflectons (e.g., direct a hardover maneuver), the FAA requires some means for assuring that the aircraft transient response cannot exceed certain maximums. For instance, for the aircraft flying in a trimmed condition, an autopilot malfunction is not permitted to subject the aircraft to a change in G's exceeding one G (plus or minus) within three seconds following the malfunction. Further, for the aircraft flying in a trimmed condition, an autopilot malfunction is not permitted to subject the aircraft to a roll angle change exceeding 60° (plus or minus) within three seconds following the malfunction, or 20° per second.

To meet the safety requirements in fixed wing type aircraft, various techniques of controlling the torque applied to the elevators and ailerons are employed. Such approaches are used since there is an aerodynamically created restoring effect or "spring loading" effect on the deflection producing servo. See patent application Ser. No. 655,653 filed Feb. 5, 1976, entitled "Method and Apparatus for Limiting Position Servo Authority", by Leo P. Kammerer, Gordon R. Fabian, and Roger D. Burns, and assigned to the assignee of this invention.

In helicopter type aircraft however, flight maneuvers are induced by changing rotor blade pitch via mechanical linkages which include devices, such as hydraulic boost systems, which provide a large mechanical advantage. Thus, for position servos on the input side of such devices, there is no "spring loading" effect on the position servo, and torque control techniques cannot produce compliance with the FAA requirements.

Present helicopter systems meeting the safety requirements use a series connected servo. Such servos are usually connected on the output side of the booster device and cause rotor blade pitch changes without moving the cyclic stick. Therefore, in order to ensure that the pilot has adequate control remaining after a malfunction, series servos must have limited displacement capability, their displacement capability usually being limited to less than 10% of the total control displacement. Thus, although such systems permit compliance with FAA requirements, the maneuverability during automatic flight control modes is severely limited due to the limited displacement capability of the blade pitch changing servos.

In accordance with the present invention there is featured a system which permits full rotor blade pitch control during automatic flight modes and simultaneously provides a hardover protection.

These and other features, objects, and advantages of the invention will become more apparent upon reference to the following specification, claims, and appended drawings in which:

Figure 1:
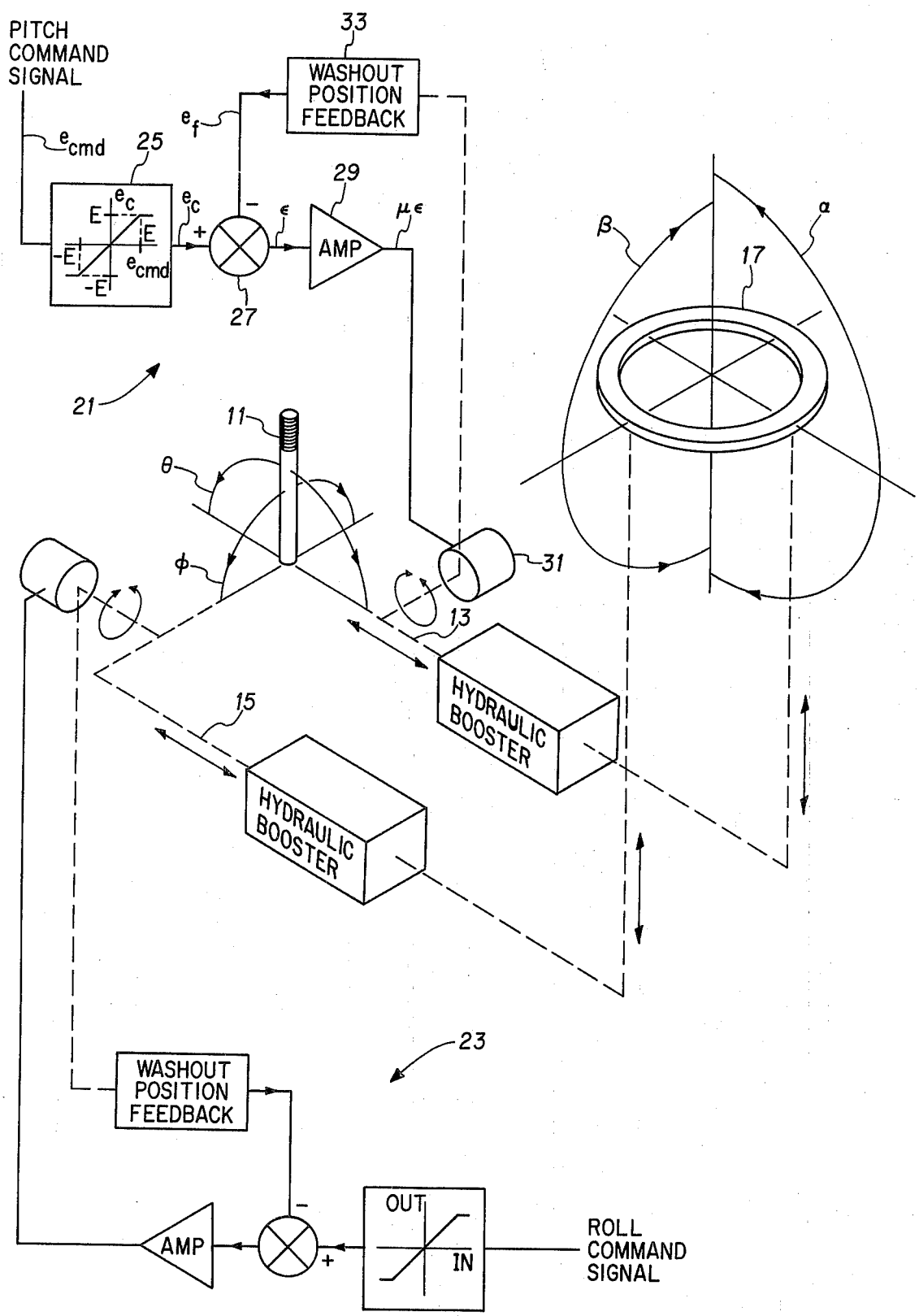
FIG. 1 is a functional block diagram of the presently preferred embodiment as applied in a helicopter cyclic control system.

In FIG. 1 there is shown in simplified fashion a typical cyclic control system for a helicopter. A pilot moveable cyclic control stick 11 is coupled through two mechanical linkage systems 13 and 15 (each represented by dashed lines) to a swash plate 17 whose stick-movement-induced tilting action produces appropriate changes in rotor blade pitch. More particularly, ignoring collective control effects, cyclic stick movement in the $\theta$ plane (i.e., fore-aft cyclic stick movement) causes the swash plate to tilt up and down in the $\alpha$ plane. Cyclic stick movement in the $\phi$ plane (i.e., left-right cyclic stick movement) causes the swash plate to tilt up and down in the $\beta$ plane. Each of linkage systems 13 and 15 includes a hydraulic booster providing a large mechanical advantage. Details of the mechanical linkages are not shown but are found in the literature and are quite familiar to those skilled in the art.

In accordance with the presently preferred embodiment of the invention, two servo systems 21 and 23, in the automatic flight mode, receive respectively autopilot generated pitch and roll command signals and automatically drive the linkage systems which in turn control the swash plate tilt and thus the rotor blade pitch, all motions being reflected directly on the cyclic stick. Using the vernacular of the art, each servo system is connected to operate in parallel with the appropriate linkage system. Except for being in the pitch and roll channels respectively, servo systems 21 and 23 in the preferred embodiment are identical, and thus only system 21 will be described in detail.

In the automatic flight mode, an autopilot generated pitch command signal $e_{cmd}$ is inputted to limiter 25 which outputs a control signal $e_c$ to the noninverting input of summing means 27. The transfer characteristic of limiter 25 may be described as follows:

$e_c = e_{cmd}$, for $-E < e_{cmd} < +E$ $e_c = E$, for $e_{cmd} < E$ $e_c = -E$, for $e_{cmd} < E$.

Summing means 27 also receives a feedback signal $e_f$ at its inverting input and outputs a corrective error signal $\epsilon$ which is equal to $e_c - e_f$. Signal $\epsilon$ is amplified in 29 by gain factor $\mu$ (typically 800) and signal $\mu\epsilon$ is inputted to servomotor 31 and causes output shaft positional changes. The servomotor output shaft which is coupled to feedback circuit 33 produces an $e_f$ appropriate to maintain $\epsilon$ substantially at zero. Circuit 33 is of a type well known in the art and generates what is generally termed a washout position signal. More particularly, circuit 33 generates an output signal proportional to the servomotor output shaft position and further includes provisions for its output signal to decay to zero in a short interval after the input ceases to change.

Figure 2:
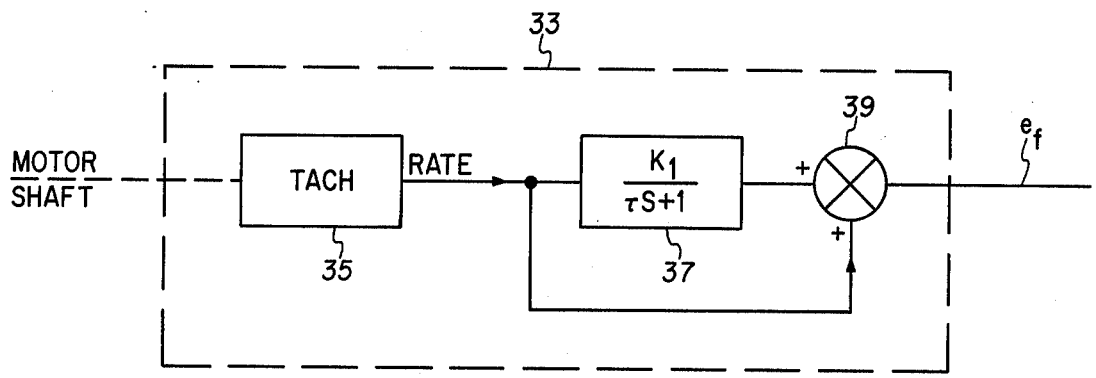
FIG. 2 shows item 33 in FIG. 1 in more detail.

FIG. 2 shows circuit 33 in greater detail. As seen therein, a tachometer 35 is mechanically connected to the servomotor shaft and provides an output signal indicative of the rate of motor shaft rotation. The rate signal is then fed to a circuit 37 whose transfer function as shown in FIG. 2 is $K_1/(\tau s+1)$. The output signal of circuit 37 and the rate signal from tachometer 35 are added in summing means 39 to produce $e_f$.

For purposes of uniformity from unit to unit, tachometer 35 is presently embodied as an incremental tachometer whose output is converted to a dc rate signal. As is know in the art, incremental tachometers provide a known number of pulses per shaft revolution and thus produce a pulse signal whose pulse rate is indicative of shaft rotation rate. The pulse rate is then converted in conventional circuitry to a dc rate signal.

As presently embodied, circuit 37 comprises a differential input operational amplifier receiving at its inverting input (i) the rate signal through a series resistor $R_1$ and (ii) a component of the amplifier output fed back through a parallel resistance-capacitance network comprising a resistance $R_2$ and a capacitance C. Thus $\tau$ is equal to $R_2 \times C$ and $K_1$ is equal to $R_2/R_1$. Such circuits are well known to those skilled in the art.

Ignoring the rate signal contribution to $e_f$, which merely provides rate damping in accordance with sound engineering principles, the overall transfer function of the FIG. 2 circuit may be approximated by $K_1 2s/(\tau s+1)$ where $K_2 s$ is the transfer function of the tachometer 35.

Figure 3:
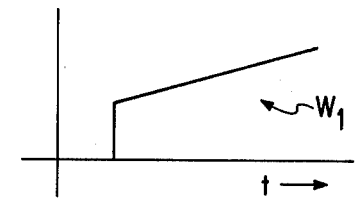
FIGS. 3 and 4 show waveforms useful in explaining the operation of the apparatus illustrated in FIGS. 1 and 2.
Figure 3:
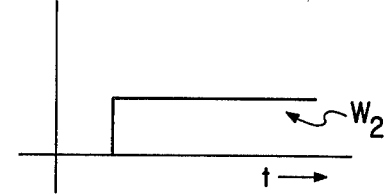

Exemplary of time domain response, for a shaft positional input according to a step plus ramp waveform as shown in FIG. 3 by $W_1$, the output of the FIG. 2 circuit will be a step function as shown in FIG. 3 by $W_2$. FIG. 3, although a reasonably accurate approximation, is of course somewhat simplified and idealized, inertial effects having been ignored. Moreover it should be noted that for the FIG. 2 circuit output signal to remain at a constant non-zero value the input is required to continue increasing. In general, when the input to the FIG. 2 circuit stops increasing, the output starts to decay.

In automatic flight mode operation with no malfunctions, a typical $e_{cmd}$ signal will increase (positively or negatively) from a zero level and as the outer loop (which includes the aircraft itself) responds, $e_{cmd}$ will be driven back to zero. For $e_{cmd}$ signals which rise to and exceed the limiting value E of limiter 25, and again assuming no malfunctions, the servomotor output position will respond initally according to $e_{cmd}$ and the helicopter will respond accordingly. After $e_{cmd}$ exceeds E however, the servomotor output position will continue increasing, but at a slower average rate, and the craft will respond more gradually than at first. Full rotor pitch authority is eventually reached (if needed for the particular maneuver) and the craft responds so as to force $e_{cmd}$ back to zero.

Figure 4:
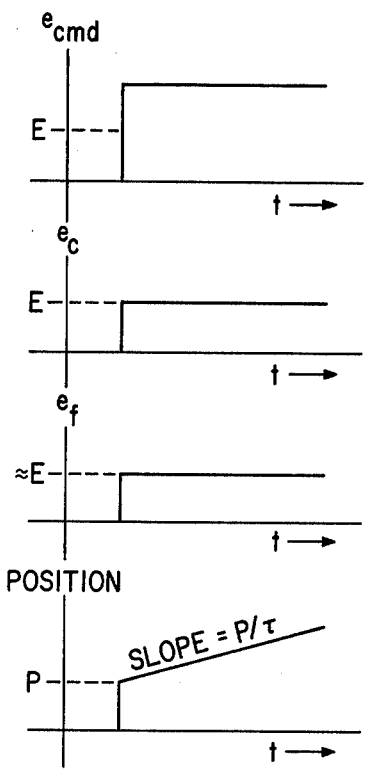

For an autopilot malfunction directing a hardover maneuver, $e_{cmd}$ may be approximated, as shown in FIG. 4, by a step function which exceeds the limiting value E of limiter 25. For such an $e_{cmd}$, $e_c$ is of course a step function of amplitude E. Servomotor 33 output position also rises rapidly to a position P which is substantially proportional to E according to $P \sim \tau E/K_1 K_2$. Thereafter in order for $e_f$ to remain constant and maintain $\mu$ at substantially zero, the shaft position increases according to a ramp function whose slope is $P/\tau$. Stick position is of course substantially proportional to servo output position.

It should now be apparent that the system of FIG. 1 limits the maximum positional authority in the short term and allows full positional authority in the long term. Thus the system provides hardover protection and simultaneously permits full control authority. The additional authority after limiting is permitted according to a less rapid average rate of positional change.

It should also be apparent that the particular values chosen for E, $\tau$, $K_1$, $K_2$, etc. will depend on the flight characteristics, control linkages, etc., of the particular helicopter in which the system is applied. For instance, one helicopter may respond faster than another for the same rotor blade pitch change. And of course, the relationship between stick position and rotor blade pitch varies from craft to craft. Thus such values should generally be determined from flight tests. In present embodiments for Bell 206 helicopters the maximum short term servomotor (or stick) position is set to about 4% to 6% of the total available during manual flight, and the remainder is made increasingly available at a rate of 1% to 2% per second.

Figure 5:
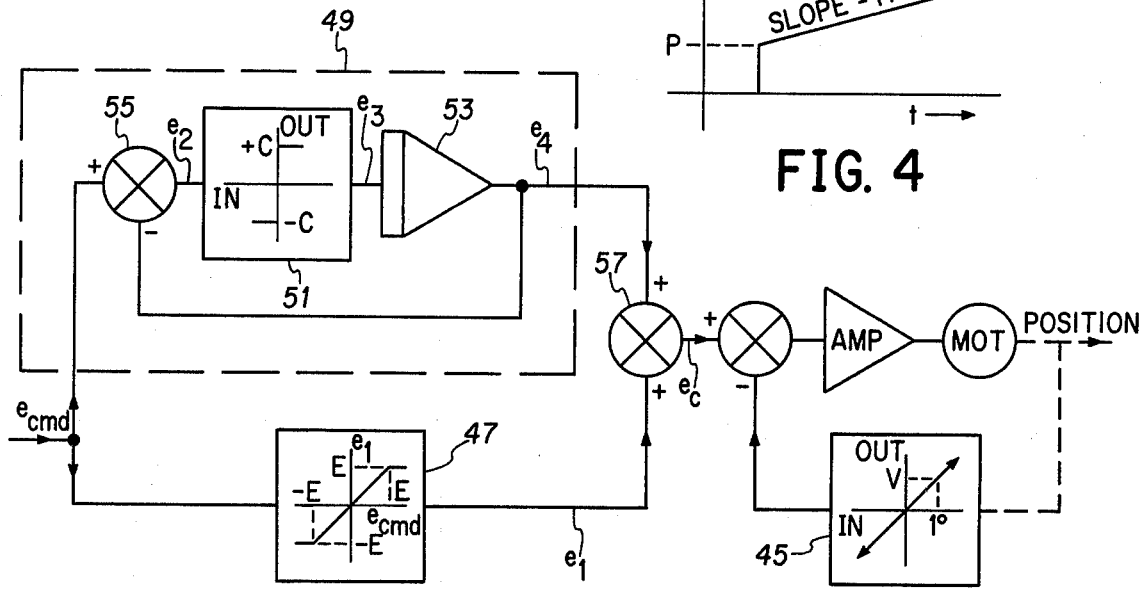
FIG. 5 is a functional block diagram of an alternative to the preferred servo systems of FIG. 1.

Turning now to FIG. 5 there is shown an alternative embodiment for producing a system response similar to that hereinabove described. Instead of having a washout position circuit in the feedback path, the FIG. 5 circuit employs pure position feedback, with no washout provision. Circuit 45 comprises a tachometer followed by an integrator and thus produces an output which is proportional to the input. Rate damping is provided as in FIG. 2 by employing the tachometer output directly. A control signal $e_c$ is again developed from the autopilot input signal $e_{cmd}$ but this time by a limiter 47 and a ramp generating circuit 49 connected in parallel. Ramp generating circuit 49 includes a comparator 51 whose transfer characteristic can be described as follows:

$e_3 = +C$ for $e_2 > 0$ $e_3 = -C$ for $e_2 = 0$.

Following comparator 51 is an integrator 53 whose output is fed back to the inverting input of summing means 55. Signal $e_{cmd}$ is fed to the noninverting input of summing means 55 and also to the input of limiter 47. The limiter and ramp generator outputs are added together in summing means 57 to form $e_c$. For an autopilot hardover-directing malfunction, $e_{cmd}$ will approximate a step function exceeding E and the servomotor output position as for the FIG. 1 apparatus, will respond substantially to a step plus ramp function.

Embodiments other than those hereinabove described may of course be advantageous in some applications. For instance the additional authority can be made available according to $t^2$ instead of $t$, merely by adding a second integrator between 51 and 53 in FIG. 5. Also, additional authority could be made available according to a delayed step function. For instance, $e_4$ might trigger a step generator at a predetermined threshold value and this step would be added to $e_1$. Also the control principles hereinabove described may also be applied to the yaw and collective control systems of helicopter type aircraft. Thus while various embodiments have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a helicopter type aircraft having an autopilot and a manually operable device mechanically coupled through appropriate linkages to a mechanism for changing rotor blade pitch, the improvement comprising:
   (a) servomotor means connected to said linkages so as to operate in parallel with said manually operable device, and
   (b) means connected between the appropriate autopilot output and said servomotor means for causing said servomotor means, in response to a substantially step function type signal comprising an increase from a value $V_0$ to a sustained value $V_2 > V_0$ and occurring at said autopilot output, to (i) initially move said manually operable device at a high average rate to a predetermined position $\rho_1$, where $\rho_1$ is a position which would be induced by a step type increase at said autopilot output from $V_0$ to a sustained value $V_1$, where $V_0 < V_1 < V_2$, and (ii) thereafter move said manually operable device at an average rate less than said high initial rate to positions greater than $\rho_1$.

2. Apparatus as defined in claim 1 wherein said last named means comprises:
   (i) first means for receiving control and feedback signals and producing therefrom a corrective error signal which causes the servomotor output position to change so as to maintain said corrective error signal substantially at zero,
   (ii) second means connected to the servomotor output for providing said feedback signal, and
   (iii) third means, including limiter means having limit $V_1$, for receiving and processing the signal at said autopilot output and delivering the control signal to said first means.

3. Apparatus as defined in claim 2 wherein said second means comprises means for providing a feedback signal indicative of position and said third means further includes means for generating in response to said step increase a component of the control signal which increases in accordance with a predetermined function of time.

4. Apparatus as defined in claim 2 wherein said second means comprises means requiring an increasing input in order to maintain a constant feedback signal and said third means comprises said limiter means.

5. Apparatus as defined in claim 1 wherein said positions greater than $\rho_1$ are capable of being substantially as large as those achievable by manual operation of said manually operable device.

* * * * *

UNITED STATES PATENT AND TRADEMARK OFFICE
CERTIFICATE OF CORRECTION

PATENT NO. : 4,082,238
DATED : 4/4/78
INVENTOR(S) : Gordon R. Fabian et al

It is certified that error appears in the above-identified patent and that said Letters Patent are hereby corrected as shown below:

Column 2, line 50, delete "$e_c=E$, for $e_{cmd}<E$" and substitute therefor --$e_c=E$, for $e_{cmd}>E$--.

Column 3, line 29, delete "$K_{12}s/(\tau s+1)$" and substitute therefor $$\frac{K_1 K_2 s}{(\tau s+1)}$$.

Column 3, line 49, delete "initally" and substitute therefor --initially--.

Column 3, line 64, delete "$\mu$" and substitute therefor --$\varepsilon$--.

Column 4, line 39, delete "$e_3=-C$ for $e_2=0$" and substitute therefor --$e_3=-C$ for $e_2<0$--.

Column 4, line 50, before "to" insert --according--.

Signed and Sealed this

Fifteenth Day of August 1978

[SEAL]

Attest:

RUTH C. MASON
*Attesting Officer*

DONALD W. BANNER
*Commissioner of Patents and Trademarks*